(12) United States Patent
Yeomans

(10) Patent No.: US 6,182,065 B1
(45) Date of Patent: Jan. 30, 2001

(54) METHOD AND SYSTEM FOR WEIGHTING THE SEARCH RESULTS OF A DATABASE SEARCH ENGINE

(75) Inventor: Andrew James Victor Yeomans, Tring (GB)

(73) Assignee: International Business Machines Corp., Armonk, NY (US)

(*) Notice: Under 35 U.S.C. 154(b), the term of this patent shall be extended for 0 days.

(21) Appl. No.: 09/064,628

(22) Filed: Apr. 22, 1998

(30) Foreign Application Priority Data

Nov. 6, 1996 (GB) .................................................. 9723386

(51) Int. Cl.[7] .................................................. G06F 17/30
(52) U.S. Cl. .................................. 707/3; 707/5; 707/10; 707/501
(58) Field of Search ........................... 707/10, 5, 1, 501, 707/3

(56) References Cited

U.S. PATENT DOCUMENTS

| | | | | |
|---|---|---|---|---|
| 5,598,557 | * | 1/1997 | Doner et al. ............................... | 707/5 |
| 5,630,117 | | 5/1997 | Oren et al. ............................. | 707/101 |
| 5,765,150 | * | 6/1998 | Burrows ..................................... | 707/5 |
| 5,819,271 | * | 10/1998 | Mahoney et al. .......................... | 707/9 |
| 5,864,871 | * | 1/1999 | Kitain et al. ........................... | 707/104 |
| 5,873,080 | * | 2/1999 | Coden et al. ............................. | 707/3 |
| 5,890,172 | * | 3/1999 | Borman et al. ......................... | 707/501 |
| 5,893,095 | * | 4/1999 | Jain et al. ................................. | 707/6 |
| 5,901,287 | * | 5/1999 | Bull et al. ............................ | 709/218 |
| 5,905,988 | * | 5/1999 | Schwartz et al. ...................... | 707/104 |
| 5,908,467 | * | 6/1999 | Barrett et al. ......................... | 709/218 |
| 5,915,251 | * | 6/1999 | Burrows et al. ....................... | 707/102 |
| 5,924,090 | * | 7/1999 | Krellenstein .............................. | 707/5 |
| 5,933,822 | * | 8/1999 | Braden-Harder et al. ................ | 707/5 |
| 5,933,827 | * | 8/1999 | Cole et al. ............................... | 707/10 |
| 5,937,404 | * | 8/1999 | Csaszar et al. ........................... | 707/9 |
| 5,944,793 | * | 8/1999 | Islam et al. ........................... | 709/220 |
| 5,983,221 | * | 11/1999 | Christy ..................................... | 707/5 |
| 5,987,457 | * | 11/1999 | Ballard ..................................... | 707/5 |
| 6,012,053 | * | 1/2000 | Pant et al. ................................. | 707/3 |
| 6,018,733 | * | 1/2000 | Watanabe .............................. | 709/239 |
| 6,021,409 | * | 2/2000 | Burrows ................................ | 707/102 |
| 6,026,398 | * | 2/2000 | Browns et al. ........................... | 707/5 |
| 6,029,195 | * | 2/2000 | Herz ..................................... | 709/219 |
| 6,032,145 | * | 2/2000 | Beall et al. ............................... | 707/5 |

FOREIGN PATENT DOCUMENTS 2312975   11/1997   (GB).
WO96/29661   9/1996   (WO).

* cited by examiner

*Primary Examiner*—Hosain T. Alam
*Assistant Examiner*—Jean M. Corrielus
(74) *Attorney, Agent, or Firm*—A. Bruce Clay

(57) ABSTRACT

A search engine searches a database containing a plurality of data entries wherein one or more of the data entries comprise a link to one or more others of the data entries. The search engine receives an input search parameter from a user and compares the input search parameter with the plurality of data entries. In response to the comparison, the search engine identifies from the plurality of data entries a set of data entries matching the input search parameter and divides the set of matched data entries into sub-sets. Each sub-set comprises data entries having links to each other. The search engine determines, for each data entry of each sub-set, a weighting in dependence on the number of links contained in each data entry to others of the data entries of the corresponding subset.

11 Claims, 3 Drawing Sheets

METHOD AND SYSTEM FOR WEIGHTING THE SEARCH RESULTS OF A DATABASE SEARCH ENGINE

TECHNICAL FIELD

The present invention relates to a search engine for searching data stored in a database.

BACKGROUND OF THE INVENTION

In recent years, there has been explosive growth in the Internet, and in particular of the WorldWide Web (WWW), which is one of the facilities provided via the Internet. The WWW comprises many pages or files of information, distributed across many different remote servers. Each page is identified by an individual address or "Universal Resource Locator (URL)". Each URL denotes both a remote server, and a particular file or page on that remote server. There may be many pages or URLs resident on a single remote server.

Typically, to utilise the WWW, a user runs a computer program called a Web browser on a user terminal such as a personal computer system. Examples of widely available Web browsers include the "WebExplorer" Web browser provided by International Business Machines Corporation in the OS/2 Operating System software, or the "Navigator" Web browser available from Netscape Communications Corporation. The user interacts with the Web browser to select a particular URL. The interaction causes the browser to send a request for the page or file identified in the selected URL to the server identified in the selected URL. Typically, the remote server responds to the request by retrieving the requested page, and transmitting the data for that page back to the requesting user terminal. The client-server interaction between the user terminal and the remote server is usually performed in accordance with a protocol called the hypertext transfer protocol ("http"). The page received by the user terminal is then displayed to the user on a display screen of the client. The client may also cause the server to launch an application such as a search engine to search for WWW pages relating to particular topics stored on other servers connected to the Internet.

WWW pages are typically formatted in accordance with a computer programming language known as hypertext markup language ("html"). Thus a typical WWW page includes text together with embedded formatting commands, referred to as tags, that can be employed to control for example, font style, font size, lay-out, etc. The Web browser parses the HTML script in order to display the text in accordance with the specified format. In addition, an html page may also contain a reference, in terms of another URL, to a portion of multimedia data such as an image, video segment, or audio file. The Web Browser responds to such a reference by retrieving and displaying or playing the multimedia data. Alternatively, the multimedia data may reside on its own WWW page, without surrounding html text.

Most WWW pages also contain one or more references to other WWW pages, which need not reside on the same server as the original page. Such references may be activated by the user selecting particular locations on the screen, typically by clicking a mouse control button. These references or locations are known as hyperlinks, and are typically flagged by the Web browser in a particular manner. For example, any text associated with a hyperlink may be displayed in a different colour. If a user selects the hyperlinked text, then the referenced page is retrieved and replaces the currently displayed page.

Further information about html and the WWW can be found in "World Wide Web and HTML" by Douglas McArthur p18–26 in Dr Dobbs Journal, December 1994, and in "The HTML Source Book" by Ian Graham, John Wiley, New York, 1995.

Conventional search engines, such as AltaVista (trade mark of Digital Equipment Corporation) and Yahoo! (trade mark of Yahoo! Inc.) search a database containing URLs of WWW pages together with one or more keywords associated with each URL. The URLs and keywords are typically sent to the entity responsible for maintaining the database by the entities responsible for the corresponding WWW pages. In operation, a typical search engine receives a search parameter from a user terminal and responds by searching the database for keywords matching the search parameter. When a match is found, the search engine adds the corresponding URL, typically in the form of a hypertext link, to a list which, in turn, is sent to the user. The user then selects a WWW page to access from the list.

A problem with conventional search engines is that they tend to return very large lists of WWW pages in response to each inquiry. Typically, a large fraction of the WWW pages listed in response to an inquiry originate at a single WWW site. The volume of WWW pages listed by a search engine in response to an inquiry makes subsequent selection of desired WWW page by a user difficult and time-consuming.

SUMMARY OF THE INVENTION

In accordance with the present invention, there is now provided a search engine for searching a database containing a plurality of data entries wherein one or more of the data entries comprise a link to one or more others of the data entries, the search engine comprising: means for receiving an input search parameter from a user; means for comparing the input search parameter with the plurality of data entries; means responsive to the comparison means for identifying from the plurality of data entries a set of data entries matching the input search parameter; means for dividing the set of matched data entries into sub-sets, each sub-set comprising data entries having links to each other; and, means for determining, for each data entry of each sub-set, a weighting in dependence on the number of links contained in each data entry to others of the data entries of the corresponding sub-set.

In preferred embodiments of the present invention, the search engine comprises means for providing the sub-sets of matched data entries to the user.

In particularly preferred embodiments of the present invention, the search engine comprises means for providing the sub-sets of matched data entries to the user arranged as a function of the weights determined for each data entry therein to the user.

Preferred examples of the present invention comprise means for providing the weights determined for each data entry in the sub-sets to the user.

Preferably, the data entries contained in the database are representative of WWW pages stored on the Internet.

It will be appreciated that the present invention extends to a computer system comprising a central processing unit, memory means, a bus architecture interconnecting the memory means and the central processing unit, and a search engine as hereinbefore described stored in the memory means for activation by the central processing unit.

Viewing the present invention from another aspect, there is now provided a method for searching a database containing a plurality of data entries wherein one or more of the data entries comprise a link to one or more others of the data entries, the method comprising: receiving an input search parameter from a user; comparing the input search parameter with the plurality of data entries; in response to the comparison, identifying from the plurality of data entries a set of data entries matching the input search parameter; dividing the set of matched data entries into sub-sets, each sub-set comprising data entries having links to each other; determining, for each data entry of each sub-set, a weighting in dependence on the number of links contained in each data entry to others of the data entries of the corresponding sub-set.

Viewing the present invention from yet another aspect, there is now provided a computer program product for searching a database containing a plurality of data entries wherein one or more of the data entries comprise a link to one or more others of the data entries, the product comprising: first code means for receiving an input search parameter from a user; second code means for comparing the input search parameter with the plurality of data entries; third code means responsive to the comparison for identifying from the plurality of data entries a set of data entries matching the input search parameter; fourth code means for dividing the set of matched data entries into sub-sets, each sub-set comprising data entries having links to each other; and fifth code means for determining, for each data entry of each sub-set, a weighting in dependence on the number of links contained in each data entry to others of the data entries of the corresponding subset.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS

Figure 1:
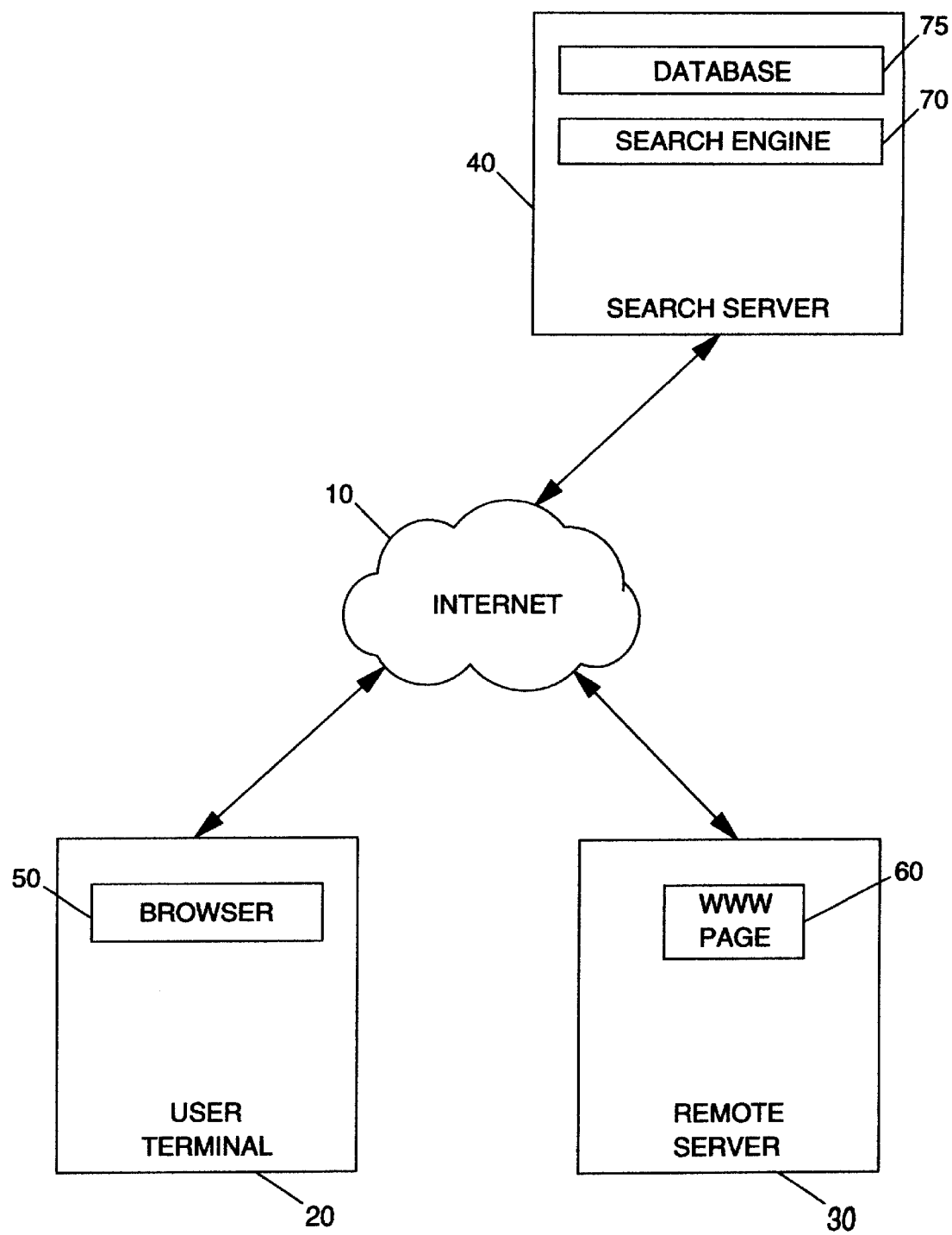
FIG. 1 is a block diagram of a data communication network.

Referring first to FIG. 1, a data communication network comprises an Internet 10. Connected to the Internet 10 is a remote server 30. Stored in the remote server 30 is a WWW page 60. A search server 40 is also connected to the Internet 10. Stored in the search server 40 is search engine 70 software and a database 75. The database 75 contains URLs, keywords, and extracts, corresponding to WWW pages, such as WWW page 60, stored on remote servers, such as remote server 30, connected to the Internet 10. The database 75 also contains, against each WWW page listed therein, an indication of pointers (eg: hypertext links) from the WWW page to other WWW pages, together with an indication of pointers (eg: hypertext links) from other WWW pages to the WWW page. Also connected to the Internet 10 is a user terminal 20. Stored in the user terminal 20 is web browser 50 software, such as "Netscape Navigator" or "IBM WebExplorer" web browser products, for enabling the user terminal to access the WWW page 60 residing on the remote server 30.

Figure 2:
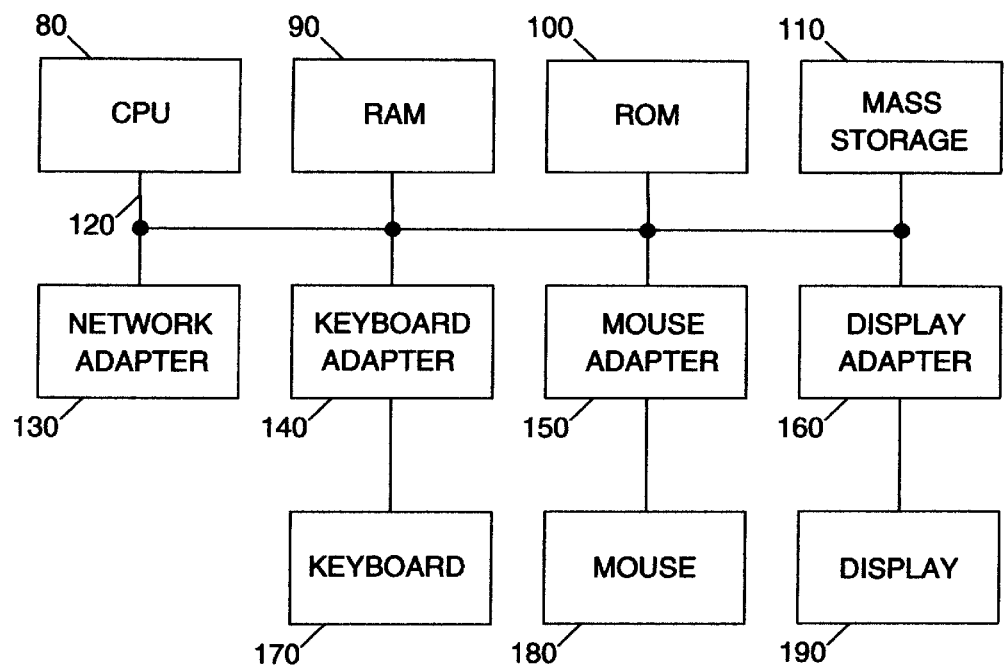
FIG. 2 is a block diagram of a user terminal of the data communications network of FIG. 1.

Referring now to FIG. 2, the user terminal 20 (FIG. 1) comprises a random access memory (RAM) 90, a read only memory (ROM) 100, a central processing unit (CPU) 80, a mass storage device 110 comprising one or more large capacity magnetic disks or similar data recording media, a network adaptor 130, a keyboard adaptor 140, a pointing device adaptor 150, and a display adaptor 160 all interconnected via a bus architecture 120. A keyboard 170 is coupled to the bus architecture 120 via the keyboard adaptor 140. Similarly, a pointing device 180, such as a mouse, touch screen, tablet, tracker ball or the like, is coupled to the bus architecture 120 via the pointing device adaptor 150. Equally, a display output device 190, such as a cathode ray tube (CRT) display, liquid crystal display (LCD) panel, or the like, is coupled to the bus architecture 120 via the display adaptor 160. The bus architecture 120 is additionally coupled to the Internet via the network adapter 130.

Basic input output system (BIOS) software is stored in the ROM 100 for enabling data communications between the CPU 80, mass storage 110, RAM 90, ROM 100, and the adaptors 130, 140, 150 and 160 via the bus architecture 120. Stored on the mass storage device 110 is operating system software and application software. The operating system software cooperates with the BIOS software in permitting control of the user terminal 20 by the application software. The application software includes the web browser 50. It will be appreciated that the search server 40 and the remote server 30 may each comprise similar hardware, BIOS, and operating system components to those of the user terminal 20. However, in the search server 40, the search engine 70 is stored in mass storage for retrieval into the RAM and execution by the CPU when accessed remotely from the browser 50 in the user terminal 20. Likewise, in the remote server 30, the WWW page 60 is stored in the mass storage for retrieval and transmission to the browser 50 on request from the browser 50 in the user terminal 20.

Referring again to FIG. 1, in operation, a user of the user terminal 20 wishing to employ the search engine 70 to search the Internet 10 for WWW pages relating to a particular topic initially accesses the search engine 70 on the search server 40 by inputting the URL of the search engine 70 to the browser 50. On receipt of the URL, the browser 50 sends a request for the search engine 70 via the Internet 10 to the search server 40. On 30 receipt of the request from the browser 50, the search server 40 retrieves and activates the search engine 70. On activation, the search engine 70 returns, via the Internet 10, an input field to the browser 50 in the user terminal 20 for display to the user. The user enters a textual search parameter such as key word or words into the input field displayed in the browser 50. The browser 50 returns the search argument entered by the user back to the search engine 70 running on the search server 40 via the Internet 10. On receipt of the search argument, the search engine 70 searches the database 75 for keywords matching the search parameter. When a match is found, the search engine 70 retrieves the corresponding URL from the database 75. The search engine thus generates a list of URLs corresponding to WWW pages matching the search parameter. The search engine 70 then adds to the list the URLs of any WWW pages containing pointers to the WWW pages identified by the key-word search.

The search engine 70 arranges the URLs retrieved from the database 75 during the aforementioned search into a hierarchy according to a weighting. WWW pages identified by a search are further processed if many of the identified WWW pages refer to the same server. In preferred embodiments of the present invention, such further processing involves applying a weighting to each matched WWW page. Then, a proportion of the weighting is added to each WWW page that refers to the matched WWW page. For example, a weighting of 100 may be applied to a WWW page, in which case 70% of the weighting may be allocated to the WWW page pointing to it. This weighting of identified WWW pages allows an index of WWW pages which refer to many WWW pages to rise higher in the hierarchy. Furthermore, index WWW pages will be included in the search results, even if they did not directly match the search parameter entered. Matched WWW pages may have their weight increased as the weighting process progresses through the hierarchy. For example, an index WWW page may be assigned a weighting because it matches the search parameter. The same index page may also gain extra weighting from the WWW pages it points to.

In particularly preferred embodiments of the present invention, the proportion is less than 100% in order that weighting has less effect as it passes up the hierarchy. Otherwise it will be appreciated that the base home page of a server may rise to the highest ranking in the hierarchy.

Figure 3:
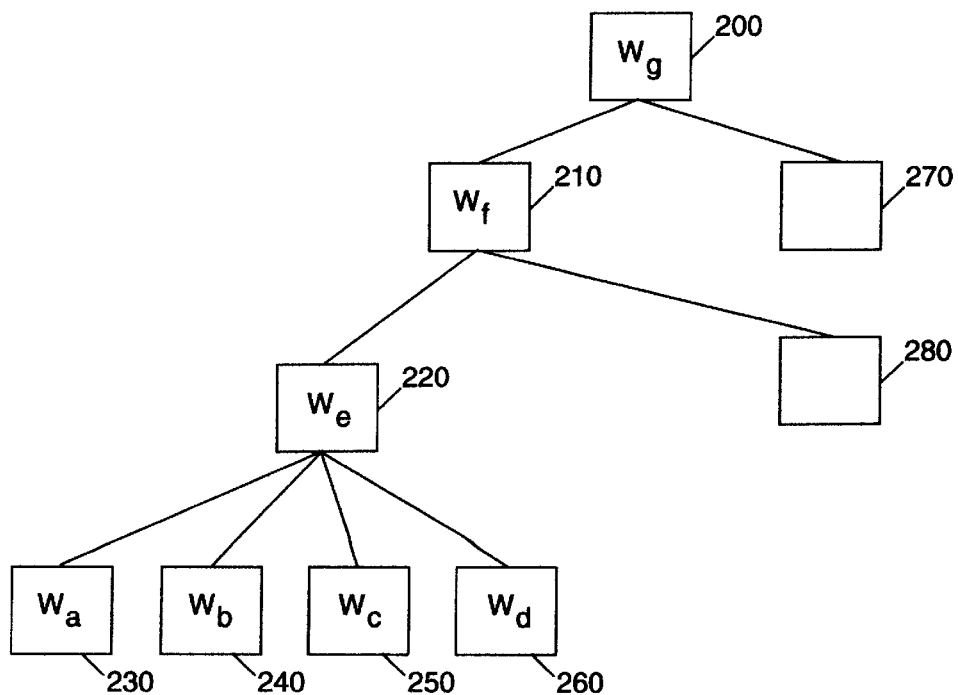
FIG. 3 is a block diagram of an output from a search engine embodying the present invention.

Referring now to FIG. 3, suppose, in the interests of explanation, that, in a set of WWW pages identified by a search executed on a search engine 70 embodying the present invention, WWW pages 230, 240, 250, and 260 stem from an index WWW page 220 which, in turn is connected with a server home page 200 via an intermediate WWW page 210. The search engine 70 calculates and applies weightings $W_a$, $W_b$, $W_c$, and $W_d$ to WWW pages 230, 240, 250, and 260 respectively. To determine weighting We for the index WWW page, search engine 70 sums the weightings applied to derivative WWW pages 230, 240, 250 and 260 and multiplies the sum by the predetermined proportion X. To determine the weighting for intermediate WWW page 210, the search engine 70 multiplies the weighting applied to the index WWW page 220 by the predetermined proportion X. Likewise, to determine the weighting for the home page 200, the search engine 70 multiplies the weighting applied to the intermediate WWW page 210 by the predetermined proportion X. For example, suppose $W_f$, and $W_g$ respectively, are to be determined. For example, suppose X=75%, and $W_a$=80, $W_b$=25, $W_c$=0, and $W_d$=40. The search engine 70 calculates $W_e$=0.75(80+25+0+40)=109. The search engine 70 then calculates $W_f$=0.75(109)=82. Next, the search engine 70 calculates $W_g$=0.75(82)=61. The weightings generated by the search engine 70 are displayed to the user along with the corresponding WWW pages identified by the search. The weighting $W_e$ assigned by the search engine to the index WWW page 220 is therefore greater than those applied to the home page 200, intermediate WWW page 210, and WWW pages 230, 240, 250, and 260, thereby indicating to the user that the index WWW page 220 is of greater significance with respect to the search argument than the other WWW pages identified. It will be appreciated that other WWW pages 270 and 280 may be connected to one or more of WWW pages 200, 210, 220, 230, 240, 250, and 260, but unrelated to the subject matter of the search conducted by the search engine 70 and, therefore, not detected by the search engine 70. In particularly preferring embodiments of the present invention, the search engine 70 displays the search results to the user in a hierarchical tree structure such as that shown in FIG. 3 (excluding the unrelated pages 270 and 280) with the weightings determined by the search engine 70 displayed adjacent to each page identified. In other embodiments of the present invention, the weightings may be displayed adjacent to the URLs corresponding to the pages identified. eg:

Search keywords: "Laptop parts"

Search Results: "server/service/laptop" Weighting - 42
"server/service/laptop/850" Weighting - 56
"server/service/laptop/850/parts" Weighting - 80

A preferred example of a search engine 70 embodying the present invention comprises computer program code executing on the CPU of the search server 40.

Figure 4:
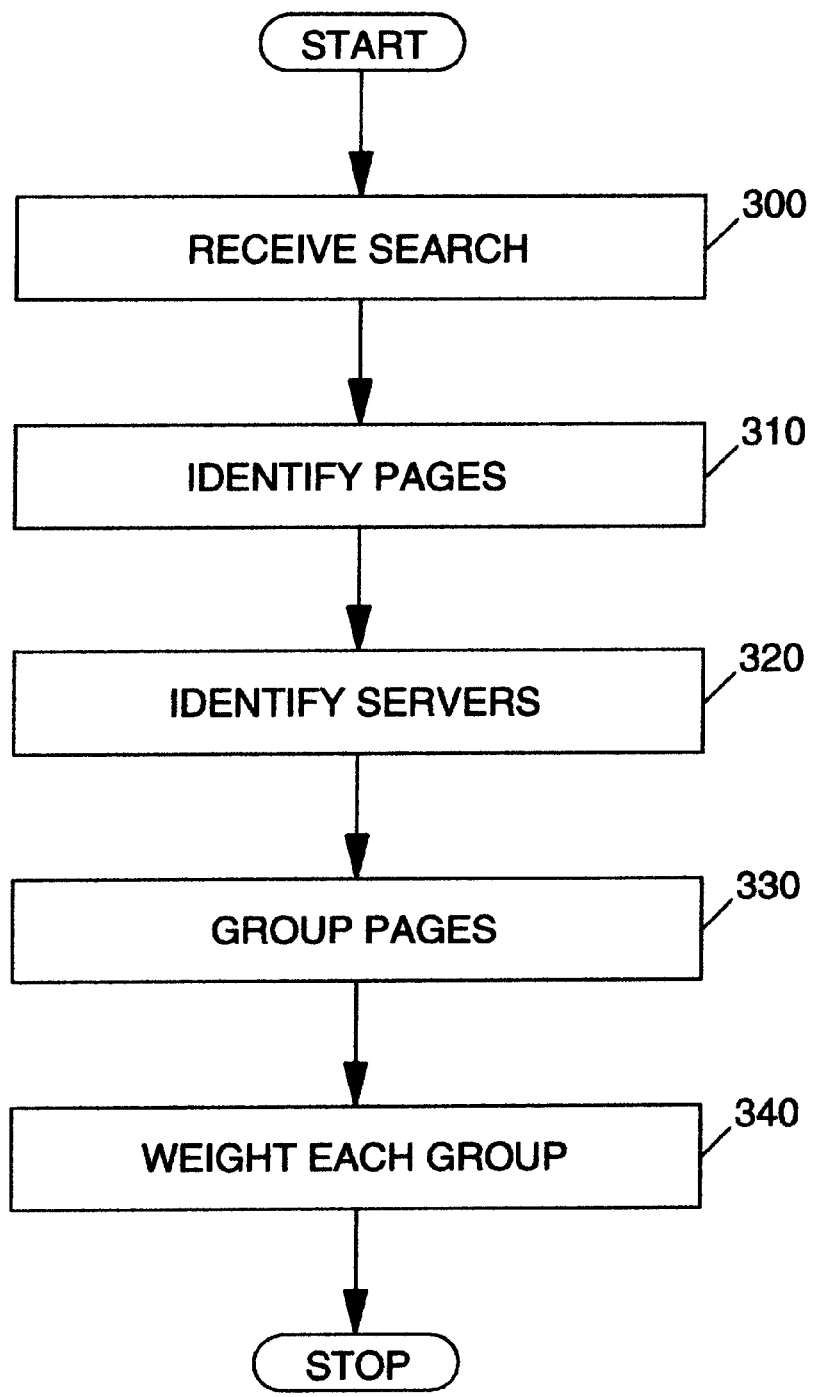
FIG. 4 is a flow diagram corresponding to a part of a search engine embodying the present invention.

Referring to FIG. 4, the search engine 70 initially, at 300, receives the search argument (eg: a keyword) from the user terminal 20. At 310, the search engine 70 identifies WWW pages corresponding to the search argument. At 320 the search engine 70 identifies the remote servers storing the identified WWW pages. At 330, the search engine 70 groups together identified WWW pages connected to each other by pointers such as hypertext links. It will be appreciated that the groups of identified WWW pages connected by pointers may be distributed across several different remote servers. At 340, the search engine 70 analyses each group of WWW pages in turn to produce a weighted hierarchy of WWW pages.

It will be appreciated that circular references are occasionally encountered in which an index WWW page points to a data WWW page which, in turn, contains a pointer to the index WWW page. In some preferred embodiments of the present invention, circular references are handled by weighting each page once. A disadvantage with this technique is that it may produce a weighting which is dependent on the order in which WWW pages are processed. In other preferred embodiments of the present invention, this problem is solved by applying two weightings to each WWW page: one in respect of the page per se and another to accumulate the proportion transferred from other WWW pages. It will be appreciated that these two weightings may have different proportional values assigned to them such as 70% applied to direct weightings, and 20% applied to transferred weightings.

In the preferred embodiments of the present invention hereinbefore described, the database 75 is stored in the same search server 40 as the search engine 70. However, it will be appreciated that, in other embodiments of the present invention, the database 77 may be stored in a different computer system to that in which the search engine 70 is implemented.

Furthermore, preferred embodiments of the present invention have been hereinbefore described with reference to a search engine for searching a database of WWW pages stored in server computer systems connected to the Internet 10. However, it will be appreciated that the present invention is equally applicable to search engines for search databases containing other forms of data.

In summary then, what has been generally described by way of example embodiment of the present invention is a search engine for searching a database containing a plurality of data entries wherein one or more of the data entries comprise a link to one or more others of the data entries. The search engine receives an input search parameter from a user and compares the input search parameter with the plurality of data entries. In response to the comparison, the search engine identifies from the plurality of data entries a set of data entries matching the input search parameter and divides the set of matched data entries into sub-sets. Each sub-set comprises data entries having links to each other. The search engine determines, for each data entry of each sub-set, a weighting in dependence on the number of references contained in each data entry to others of the data entries of the corresponding sub-set.

What is claimed is:

1. A search engine for searching a database containing a plurality of data entries, wherein one or more of the plurality of data entries comprise a link to one or more others of the plurality of data entries, the search engine comprising:

means for receiving an input search parameter from a user;

means for comparing the input search parameter with the plurality of data entries;

means responsive to the comparison means for identifying from the plurality of data entries a set of data entries matching the input search parameter;

means for dividing the set of matched data entries into sub-sets, each of the sub-sets comprising data entries having links to each other; and means for determining, for each of the linked data entries of each of the sub-sets, a weighting dependent on a number of links contained in each of the linked data entries to others of the linked data entries therein.

2. A search engine as claimed in claim 1, further comprising means for providing the sub-sets of the linked data entries to the user.

3. A search engine as claimed in claim 2, further comprising means for providing the weighting determined for each of the linked data entries in the sub-sets to the user.

4. A search engine as claimed in claim 1, further comprising means for providing the sub-sets of the linked data entries to the user arranged as a function of the weighting determined for each of the linked data entries therein.

5. A search engine as claimed in claim 1, wherein the plurality of data entries contained in the database are representative of WWW pages stored on the Internet.

6. A computer system comprising central processing unit, memory means, a bus architecture interconnecting the memory means and the central processing unit, and a search engine as claimed in claim 1 stored in the memory means for activation by the central processing unit.

7. A method for searching a database containing a plurality of data entries, wherein one or more of the plurality of data entries comprise a link to one or more others of the plurality of data entries, the method comprising the steps of:

receiving an input search parameter from a user;

comparing the input search parameter with the plurality of data entries;

in response to the comparison, identifying from the plurality of data entries a set of data entries matching the input search parameter;

dividing the set of matched data entries into sub-sets, each of the sub-sets comprising data entries having links to each other; and determining, for each of the linked data entries of each of the sub-sets, a weighting dependent on a number of links contained in each of the linked data entries to others of the linked data entries therein.

8. A method as claimed in claim 7, further comprising the step of providing the sub-sets of the linked data entries to the user.

9. A method as claimed in claim 8, further comprising the step of providing the weighting determined for each of the linked data entries in the subsets to the user.

10. A method as claimed in claim 7, further comprising the step of providing the sub-sets of the linked data entries to the user arranged as a function of the weighting determined for each of the linked data entries therein.

11. A computer program product for searching a database containing a plurality of data entries, wherein one or more of the plurality of data entries comprise a link to one or more others of the plurality of data entries, the product comprising:

first code means for receiving an input search parameter from a user;

second code means for comparing the input search parameter with the plurality of data entries;

third code means responsive to the comparison for identifying from the plurality of data entries a set of data entries matching the input search parameter;

fourth code means for dividing the set of matched data entries into sub-sets, each of the sub-sets comprising data entries having links to each other; and fifth code means for determining, for each of the linked data entries of each of the sub-sets, a weighting dependent on a number of links contained in each of the linked data entries to others of the linked data entries therein.

* * * * *